May 14, 1940.　　　A. C. PERBAL　　　2,200,518

ADJUSTABLE BRACKET STRUCTURE

Filed April 29, 1938　　　2 Sheets-Sheet 1

INVENTOR
ALBERT C. PERBAL

Lawrence H. Cohn
ATTORNEY

May 14, 1940.  A. C. PERBAL  2,200,518

ADJUSTABLE BRACKET STRUCTURE

Filed April 29, 1938  2 Sheets-Sheet 2

INVENTOR
ALBERT C. PERBAL

BY Lawrence H. Cohn
ATTORNEY

Patented May 14, 1940

2,200,518

UNITED STATES PATENT OFFICE 2,200,518

ADJUSTABLE BRACKET STRUCTURE

Albert C. Perbal, St. Louis, Mo.

Application April 29, 1938, Serial No. 205,033

8 Claims. (Cl. 248—280)

My invention relates to improvements in adjustable bracket structures for lighting or other apparatus requiring a mobile support, and has for its principal object the provision of an improved device of this character embodying means for counterbalancing the supported object in any position within the range of the bracket, whereby the object is adapted to be easily moved, yet remains stable in any adjusted position.

The device of my invention includes a jointed bracket arm pivotally mounted on a base member to swing in a vertical plane, the arm comprising an outer section which carries the supported object or apparatus, pivotally connected to an inner arm section for angular movement in a vertical plane relative thereto. Counterbalancing means of novel construction are located in or adjacent to the base member and are so connected to the inner arm section, and therethrough to the outer arm section, that both sections are sustained in stable condition in all adjusted positions thereof.

The invention resides in the construction, combination, and relation of parts that result in an improved bracket structure of the character described and specifically defined in the appended claims.

Figure 1:
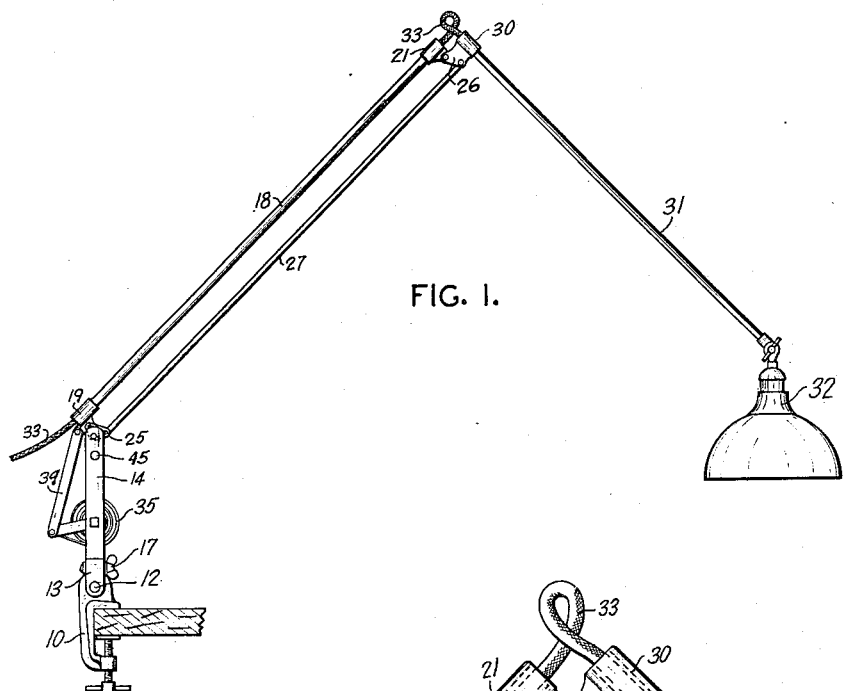
Figure 3:
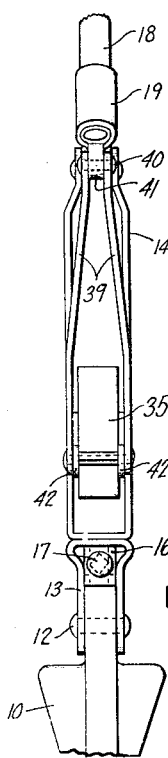
Figure 2:
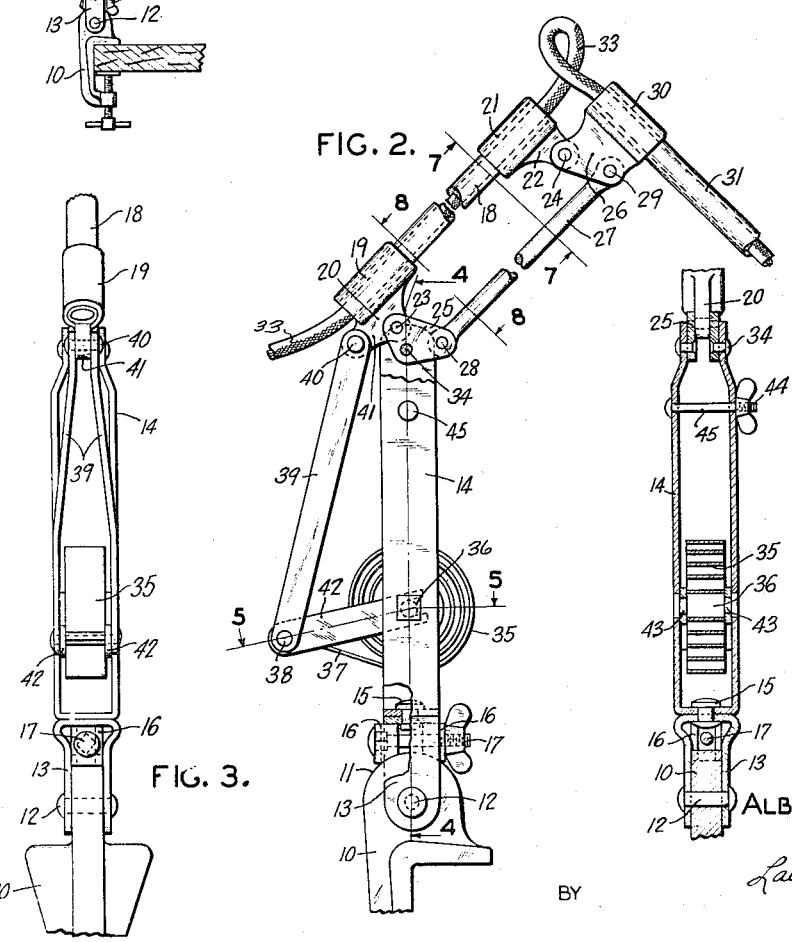
Figure 4:
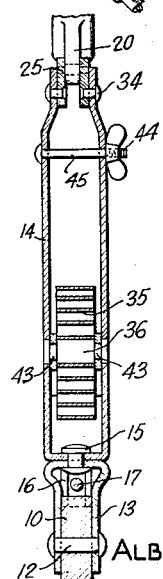
Figure 5:
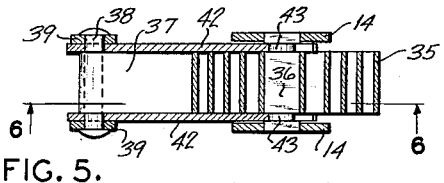
Figure 7:
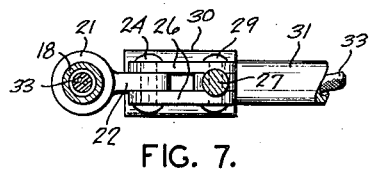
Figure 6:
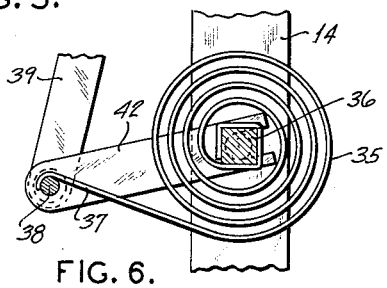
Figure 8:
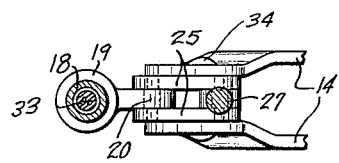
Figure 9:
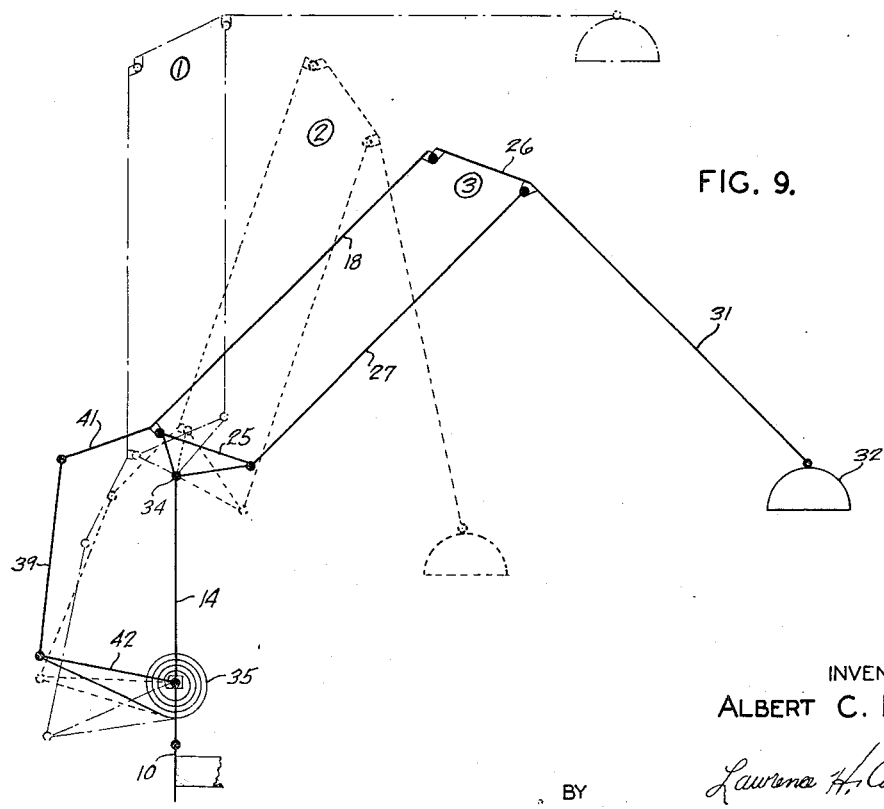

In the accompanying drawings, Fig. 1 is a side elevational view of a bracket structure embodying the features of my invention, shown in connection with its use as an adjustable support for lighting apparatus; Fig. 2 is a side elevation showing structural details of the device of Fig. 1; Fig. 3 is a fragmentary end elevation of the device of Fig. 1; Fig. 4 is a sectional elevation, the section being taken as indicated by line 4—4 of Fig. 2; Fig. 5 is a transverse section as taken at line 5—5 of Fig. 2; Fig. 6 is a section taken at line 6—6 of Fig. 5; Figs. 7 and 8 are fragmentary sections as taken at lines 7—7 and 8—8 of, respectively, Fig. 2, and Fig. 9 is a diagrammatic view showing the bracket structure in a number of different conditions of angular arrangement.

In the bracket structure illustrated in the accompanying drawings, constituting a presently preferred embodiment of my invention, reference numeral 10 designates a base part in the form of a clamp whereby the device is adapted to be attached to a table, desk or other support. The base part 10 terminates at its upper end in a cylindrical surface 11 having its axis of curvature coincident with a bearing element 12 extending horizontally through the base part. A post or column has its lower end journalled on bearing element 12 and is thereby adapted to be swung in a vertical plane relative to the base part 10. Such column is preferably made up of a pair of U-shaped members 13 and 14 arranged in back-to-back relation and connected together by a pivot pin 15 that extends longitudinally through adjacent yoke portions of the said members.

It will appear that the composite column structure, by reason of its jointed connection with the base part, is adapted to extend vertically even though the base part is angularly mounted on a supporting object, and further, that the upper column member 14 and bracket parts carried thereby are adapted to be swung horizontally through an arc of 360 degrees about the vertical axis defined by pivot pin 15.

As a means for locking the composite column structure in vertical position there is provided a pair of wedge-shaped clamping elements 16 which seat upon the rounded surface 11 of the base part and are disposed at relatively opposite sides of the longitudinal axis of the column. The elements 16 are adapted to be drawn toward each other by means of a bolt and nut assembly 17 to wedge them tightly between the surface 11 of the base part and the yoke portion of member 13, thereby effecting a rigid connection of these parts.

The inner section of the jointed bracket arm comprises an elongated tube 18 which is equipped at its inner end with fitting 19 fixedly secured thereto, fitting 19 having a lateral fin-like projection 20. Fixedly secured on the outer end of tube 18 is a fitting 21 having a lateral fin-like projection 22, the projections 20 and 22 being disposed in a common vertical plane. Pivotally connected to the projections 20 and 22 by horizontal pins 23 and 24 are short link elements 25 and 26, respectively, which in turn are pivotally connected to the ends of a rod 27 by pins 28 and 29, the tube 18, link elements 25 and 26, and rod 27 constituting the members of a parallelogram linkage system. The outer link element 26 is formed integrally on a sleeve 30 which embraces the inner end of a tube 31 forming the outer arm section of the jointed bracket, such tube carrying at its free end the object to be supported. In the present example such object is depicted as a lamp head and reflector assembly, designated 32, adapted to be supplied with current by an electrical cord 33 which extends through the tubular arm sections 18 and 31.

The compound inner arm section previously described is pivotally mounted on the upper end of the column structure by means of a pivot pin 34 which extends transversely through link element 25, preferably at a point intermediate of the pins 23 and 26, the pin 34 extending horizontally between and being carried by the side portions of column member 14.

It will now appear that the entire bracket arm, considered as a unit, is free to swing in a vertical plane about pivot 34, and that the outer arm section is free to swing with respect to the inner arm section toward or from the vertical column structure. Obviously, movement of the outer arm relative to the inner arm as aforesaid, changes the angular position of the inner link element 25 with respect to the column structure and, accordingly, a balancing force applied to the said link element that tends to oppose movement thereof occasioned by a dropping of the outer section will serve to maintain the outer arm section in adjusted angular position with respect to the inner section. Moreover, the same force may be utilized to balance and maintain the entire bracket arm in an adjusted position with respect to the supporting column, as will be hereinafter explained.

As a means for equilibrating the jointed bracket arm, and the several sections thereof, there is provided a spiral torsion spring 35 whose inner end is anchored to a squared shaft 36 extending centrally therethrough, transversely between the side portions of member 14, shaft 36 having its ends seated in squared recesses formed in such side portions. The outer or free end 37 of the spring bears downwardly on a pin 38 connecting the lower ends of paired links 39, the upper ends of such links being pivotally connected by a pin 40 to a rearwardly projecting portion 41 of fin 20. The lower ends of the links 39 are maintained at a fixed radial distance from shaft 36 by struts 42 which extend between the pin 38 and cylindrical portions 43 of shaft 36, the struts being provided with bifurcated inner ends forming bearing surfaces that pivotally engage portions 43.

By reason of the described manner in which the force of spring 35 is transmitted to links 39 and therethrough to member 18, which, with its end fitting 19, constitutes a lever, the effective force of the spring on the lever remains substantially constant in spite of changes in spring force on pin 38 due to variations in spring deflection.

Slight differences which may occur between the gravitational forces acting on the bracket arm and the counterbalancing forces produced by spring 35 are compensated for by friction at the surfaces of the members which engage link element 25. The frictional pressure is adapted to be regulated by a wing nut 44 threaded on a bolt 45 that extends transversely through the side portions of member 14, near its upper end. Tightening of nut 44 serves to increase the pressure between the surfaces at which link 25, (which is preferably made up of two corresponding parts as best appears from Fig. 8), contacts column member 14 and arm members 18 and 27.

It will be observed that spring 35 acting through the paired links 39 produces a counter-clockwise moment or force on tube 18 which opposes the gravitational moment thereof. Also, the spring force is transmitted through part 20 to link element 25 and exerts a counter-clockwise moment of force on such element which is transmitted to the outer link element 26 and arm section 31. Thus, spring 35 serves to balance the gravitational forces tending to move the outer arm section relative to the inner arm section.

The manner in which the linkage system, consisting of struts 42 and links 39, operates to compensate for variations in spring force resulting from spring deflection will be understood by referring to Fig. 9. When the bracket arm is disposed in position 2, spring 35 is under greater tension and accordingly exerts a greater counterbalancing force on links 39 than it does under the conditions illustrated by position 1. However, when in the latter position, the upward thrust on links 39 tends to compress struts 42 (because of their angular disposition) and the relatively lesser spring force is augmented by the force acting through these struts. Struts 42, in effect, comprise a crank arm which is acted upon by spring 35 that tends to turn the same in opposition to the turning moment transmitted thereto by links 39.

Having described my invention with reference to a presently preferred embodiment thereof, it will be understood that various changes may be made in the device herein set forth without departing from the spirit and full intendment of the invention as defined by the appended claims.

I claim:

1. An adjustable bracket structure including a support, a jointed arm having an inner section comprising a pair of relatively parallel bars, and link elements pivotally interconnecting the adjacent ends of said bars in the formation of a parallelogram linkage system, an outer section extending from one of said link elements, means pivotally connecting the other link element to said support, and counterbalancing means for the bracket arm comprising a crank arm journalled on said support, a coupling member between said crank arm and inner bracket section, said coupling member serving to transmit load forces acting on said inner bracket section to said crank arm, and a spring mounted on said support and coacting with said crank arm to oppose load forces transmitted to the crank arm.

2. In an adjustable bracket structure, a support having a horizontal pivot pin fixedly positioned thereon, a member pivotally mounted on said pin, a lever pivoted between its ends to said member and being adapted for compound movement with respect to said pin, a load-carrying arm pivoted to one end of said lever, counterbalancing means of substantially constant force value acting on the opposite end of said lever, and means interconnecting said load-carrying arm and member for conjoint pivotal movement, whereby any movement of said arm that varies the moment of load forces acting on said lever about said fixed pivot pin results in lever translation that effects a corresponding and equalizing variation in the moment of counterbalancing force acting on said lever about said fixed pivot pin.

3. In an adjustable bracket structure, a support having a horizontal pivot pin fixedly positioned thereon, a member pivotally mounted on said pin, a lever pivoted between its ends to said member, said lever being adapted for pivotal and translational movement with respect to said pin, a load-carrying arm pivoted to one end of said lever, counterbalancing means of substantially constant force value connected to the opposite end of said lever, a rigid link pivotally connected at one end to said load-carrying arm and at its opposite end to said member, said link and member coacting to translate said lever with respect to said fixed pivot pin responsive to movements of said load-carrying arm, whereby any movement of said arm that varies the moment of load forces acting about said fixed pivot pin effects a corresponding and equalizing variation in the moment of counterbalancing force acting about said fixed pivot pin.

4. In combination with a support having a horizontal pivot pin fixed thereto, a jointed bracket comprising a member pivotally mounted on said pin, a lever pivoted between its ends to said member and being adapted for end-wise translation to effect a variation in the length of its moment arms acting about said fixed pivot pin, a load-carrying arm pivoted to the outer end of said lever, means connecting said load-carrying arm and said member, adapted to transmit pivotal movement of the load-carrying arm to said member, and thereby to effect translation of said lever as aforesaid, and a device adapted to counterbalance the bracket as a whole about said fixed pivot pin and the load-carrying arm about its pivotal connection with said lever, said device comprising a spring operatively connected to said lever in counteracting relation to the gravitational forces acting on said lever, and means associated with said spring adapted to compensate for changes in force value thereof due to spring deflection, whereby the counterbalancing force of said spring, acting on said lever, remains substantially constant throughout its operating range.

5. In an adjustable bracket, the combination with a supporting column having means thereon defining a relatively fixed horizontal axis, a member mounted on said column to rock about said fixed axis, a lever pivoted between its ends to said member to rock relative thereto about a second horizontal axis spaced from said first axis, said lever being thereby adapted for compound movement with respect to said first axis, a load-carrying arm pivoted to one end of said lever, a link element pivotally connected between said member and load-carrying arm, said link, member, lever, and load-carrying arm being arranged to constitute a parallelogram linkage, and a single counterbalancing agency of substantially constant force value acting on said lever, said agency being adapted to equilibrate said lever, and acting through said linkage system to equilibrate said load-carrying arm with respect to the lever.

6. In an adjustable bracket, the combination with a support, an element mounted to rock about a fixed horizontal axis on said support, a lever pivoted between its ends to said member and adapted thereby for pivotal and translational movement with respect to said fixed axis, a load-carrying arm pivoted to one end of said lever, a link pivotally connected at one end to said load-carrying arm and at its opposite end to said member, said link, lever, member and arm being arranged and interconnected to constitute a parallelogram linkage, and a simple counterbalancing agency adapted to equilibrate said lever, and acting through said linkage to equilibrate said load-carrying arm, said counterbalancing agency comprising a spring fixed at one end to said support and having its opposite end connected to said lever for displacement thereby, and means associated with said spring adapted to compensate for changes in force value thereof due to changes in spring displacement, whereby the effective counterbalancing force imparted to said lever remains substantially constant.

7. In combination with a bracket of the character described including a support and a lever mounted on said support for pivotal movement about a horizontal axis, of means for applying an equilibrating force of substantially constant magnitude to said lever, said means comprising a crank mounted to rock about a horizontal axis on said support, a link interconnecting said lever and crank, and a torsion spring arranged to apply its force to said crank at a substantially fixed angular direction relative thereto.

8. An adjustable bracket comprising a column, a member pivoted to rock about a fixed horizontal axis on said column, a lever pivoted to said member and adapted for pivotal and translational movement with respect to said fixed horizontal axis, a load-carrying arm pivoted to said lever, a rod pivotally connected at its ends to said load-carrying arm and said member, and means for equilibrating said lever and load-carrying arms, said means comprising an arm mounted to rock about a horizontal axis on said column, a link pivotally connected at its ends to said arm and said lever, and a torsion spring coacting with said arm and arranged to apply its force at a fixed angle with respect to said arm.

ALBERT C. PERBAL.